United States Patent
Wen et al.

(10) Patent No.: US 10,123,115 B2
(45) Date of Patent: *Nov. 6, 2018

(54) METHOD, SYSTEM AND CIRCUITS FOR HEADSET CROSSTALK REDUCTION

(71) Applicant: MediaTek Inc., Hsinchu (TW)

(72) Inventors: Sung-Han Wen, Taipei (TW); Yu-Cheng Chang, Taipei (TW); Kuan-Ta Chen, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/853,745

(22) Filed: Dec. 23, 2017

(65) Prior Publication Data

US 2018/0124512 A1    May 3, 2018

Related U.S. Application Data

(63) Continuation of application No. 15/232,802, filed on Aug. 9, 2016, now Pat. No. 9,888,318.

(60) Provisional application No. 62/259,699, filed on Nov. 25, 2015.

(51) Int. Cl.
| | |
|---|---|
| *H04R 3/00* | (2006.01) |
| *H04B 3/32* | (2006.01) |
| *H04R 1/10* | (2006.01) |
| *H04R 5/04* | (2006.01) |
| *H04R 29/00* | (2006.01) |

(52) U.S. Cl.
CPC .............. *H04R 3/007* (2013.01); *H04B 3/32* (2013.01); *H04R 1/1041* (2013.01); *H04R 5/04* (2013.01); *H04R 29/001* (2013.01); *H04R 2420/09* (2013.01)

(58) Field of Classification Search
CPC .......... H04R 3/00; H04R 3/005; H04R 3/007; H04R 5/04; H04R 1/1041; H04R 1/1083; H04R 25/405; H04R 2410/05; H04R 29/00; H04R 29/001; H04R 2420/09; G10L 21/0208; G10K 2210/00; H04B 3/32

See application file for complete search history.

(56) References Cited

U.S. PATENT DOCUMENTS

| | | | | |
|---|---|---|---|---|
| 8,917,882 | B2* | 12/2014 | Miao | H04R 1/1041 381/123 |
| 9,888,318 | B2* | 2/2018 | Wen | H04B 3/32 |
| 2010/0027799 | A1* | 2/2010 | Romesburg | H04R 5/04 381/28 |
| 2011/0116646 | A1* | 5/2011 | Sander | H04R 1/1083 381/71.6 |
| 2013/0266146 | A1* | 10/2013 | Miao | H04R 1/1041 381/28 |

(Continued)

*Primary Examiner* — Thang V Tran
(74) *Attorney, Agent, or Firm* — Tong J. Lee

(57) ABSTRACT

A device for removing crosstalk includes a jack to form an electrical connection with a plug, and an audio unit to provide a left audio channel and a right audio channel to the plug. The audio unit includes a crosstalk cancellation circuit. The crosstalk cancellation circuit estimates the crosstalk between the left audio channel and the right audio channel to obtain an estimated right-to-left crosstalk and an estimated left-to-right crosstalk, and to remove the crosstalk by subtracting the estimated right-to-left crosstalk and the estimated left-to-right crosstalk from digital signals in the left audio channel and the right audio channel, respectively.

17 Claims, 8 Drawing Sheets

(56) References Cited

U.S. PATENT DOCUMENTS

| | | | | |
|---|---|---|---|---|
| 2013/0336506 A1* | 12/2013 | Prentice | ................... | H04R 3/00 |
| | | | | 381/309 |
| 2014/0093109 A1* | 4/2014 | Bazarjani | ................. | H04R 5/04 |
| | | | | 381/309 |
| 2014/0376753 A1* | 12/2014 | Nystrom | ................ | H04R 29/00 |
| | | | | 381/309 |
| 2015/0139437 A1* | 5/2015 | Chang | .................. | H04R 1/1041 |
| | | | | 381/74 |
| 2015/0296286 A1* | 10/2015 | Prentice | .............. | H04R 1/1083 |
| | | | | 381/71.6 |
| 2015/0349464 A1* | 12/2015 | Hogan | .............. | H01R 13/7039 |
| | | | | 439/620.21 |
| 2016/0127828 A1* | 5/2016 | Maher | ..................... | H04R 5/04 |
| | | | | 381/94.1 |
| 2016/0142810 A1* | 5/2016 | Freitas | ................ | H04R 1/1041 |
| | | | | 381/74 |
| 2017/0048605 A1* | 2/2017 | Kou | ..................... | H04R 1/1025 |
| 2017/0085978 A1* | 3/2017 | Su | ........................ | H04R 1/1025 |

* cited by examiner

METHOD, SYSTEM AND CIRCUITS FOR HEADSET CROSSTALK REDUCTION

CROSS-REFERENCE TO RELATED APPLICATIONS

This application is a continuation application of U.S. patent application Ser. No. 15/232,802 filed on Aug. 9, 2016, and claims the benefit of U.S. Provisional Application No. 62/259,699 filed on Nov. 25, 2015, the entire contents of which are hereby incorporated by reference.

TECHNICAL FIELD

Embodiments of the disclosure relate to signal processing; more specifically, to reduction of headset crosstalk.

BACKGROUND

In stereo audio reproduction, crosstalk refers to signals leaking from one channel to another. For example, signals in the left audio channel and the right audio channel may leak into each other, causing a reduction in channel separation.

Audio devices often include a jack (i.e., socket), such as a headset jack, for receiving a media plug such as a headset plug of a headset. For example, such audio devices may include, but are not limited to, mobile phones, MP3 players, handheld gaming devices, tablets, personal computers, laptop computers, and all kinds of media devices that generate audio signals.

A headset combines a headphone with a microphone. The position of the microphone terminal may vary across different types of headset plugs. An audio device may be configured to accommodate different types of plugs; for example, a 4-pole plug of a European type or a North American type. According to the European type plug layout, the plug terminals are ordered as left audio (L), right audio (R), microphone (M), and ground (G), as enumerated from the tip to the base of the plug. On the other hand, according to a North American type plug layout, the plug terminals are ordered as L, R, G and M. To accommodate the two types of plugs, a media device typically includes a swap switch that can swap the connections of the M and G plug terminals to its internal circuitry. However, the swap switch may cause crosstalk between different channels of the media device, as explained below with reference to FIGS. 1A, 1B and 1C.

FIG. 1A illustrates a 3-pole plug 110 that has three plug terminals: L, R and G, as enumerated from the tip to the base of the plug 110. The plug 110 is connected to a 3-pole headset jack 120; only the jack terminals 125 and a portion of its internal circuitry is shown. The jack terminals 125 are labeled by 1, 2 and 3, corresponding to L, R and G plug terminals, respectively. To prevent crosstalk between the L and R audio channels, the headset jack 120 includes a connection, referred to as HP_Sense, to connect the amplifier inputs to the ground connection (i.e., the G plug terminal). The HP_Sense serves as a common reference point for the L and R audio channels.

FIG. 1B illustrates a European type headset plug 130 and FIG. 1C illustrates a North American type headset plug 140, both connecting to a 4-pole headset jack 160. A swap switch 150 is coupled to the 4-pole headset jack 160 to accommodate different types of 4-pole headset plugs. In FIGS. 1B and 1C, HP_sense is no longer connected to the G plug terminal directly; it is connected to the G plug terminal via the swap switch 150. The resistance of the swap switch 150 ($R_{sw}$) increases the crosstalk between the L and R audio channels.

One approach to the crosstalk removal is to replace the swap switch 150 with multiple switches such that the path labeled "ADC" and the path labeled "HP_Sense" are both connected to both jack terminal 3 and jack terminal 4 via these switches. By controlling the on/off of these switches in accordance with the type of the plug, HP_Sense can be directly connected to the G plug terminal for either type of headset plug. However, potential Electromagnetic compatibility (EMC) problems may occur when integrating these switches into a system-on-a-chip (SOC). Incorporating extra balls and beads to the chip may overcome the EMC problems but may add significant hardware cost.

Moreover, none of the existing approaches address the issue of crosstalk from the L and R audio channels to the microphone channel. Therefore, there is a need to mitigate the aforementioned crosstalk problems with a more comprehensive and cost-effective approach.

SUMMARY

In one embodiment, a device is provided to remove crosstalk. The device comprises an audio unit to provide a left audio channel and a right audio channel to a plug; and a jack to form an electrical connection with the plug. The audio unit further comprises a crosstalk cancellation circuit. The crosstalk cancellation circuit estimates the crosstalk between the left audio channel and the right audio channel to obtain an estimated right-to-left crosstalk and an estimated left-to-right crosstalk, and to remove the crosstalk by subtracting the estimated right-to-left crosstalk and the estimated left-to-right crosstalk from digital signals in the left audio channel and the right audio channel, respectively.

In another embodiment, a device is provided to remove crosstalk. The device comprises an audio unit to provide a left audio channel, a right audio channel and a microphone channel to a plug; a jack to form an electrical connection with the plug; and a swap switch configurable to swap connections of a ground terminal and a microphone terminal of the plug to the audio unit. The audio unit further comprises a crosstalk cancellation circuit. The crosstalk cancellation circuit estimates the crosstalk from the left audio channel and the right audio channel to the microphone channel to obtain an estimated left-to-microphone crosstalk and an estimated right-to-microphone crosstalk, and to remove the crosstalk by subtracting the estimated left-to-microphone crosstalk and the estimated right-to-microphone crosstalk from a digital signal in the microphone channel.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the disclosure may be practiced without these specific details. In other instances, well-known circuits, structures and techniques have not been shown in detail in order not to obscure the understanding of this description. It will be appreciated, however, by one skilled in the art, that the disclosure may be practiced without such specific details. Those of ordinary skill in the art, with the included descriptions, will be able to implement appropriate functionality without undue experimentation.

Embodiments of the disclosure provide a system, method and circuitry for headset crosstalk reduction. An audio unit in a device, such as an audio or media device, provides audio signals to and receives microphone signals from a headset that is plugged to the device. An estimated crosstalk is subtracted from the channels of the audio unit to remove the crosstalk between the left and right audio channels, and the crosstalk from the left and right audio channels to the microphone channel. The estimated crosstalk may be derived from a set of crosstalk coefficients, which may be obtained by on-chip background calibration, chip final test, factory test, or a combination thereof. In one embodiment, the crosstalk coefficients may be obtained by sending a test signal on a source channel (e.g., the left or right audio channel) and calculating the ratio of a source channel signal value to an affected channel signal value. In another embodiment, the crosstalk coefficients may be calculated from a set of predetermined equations. The parameters used in the equations may include resistance values of the headset plug terminals and components in the device. In one embodiment, at least some of the parameters may be detected by an impedance detector, such that the system may be adapted to many different headsets with different resistance values.

Figure 1:
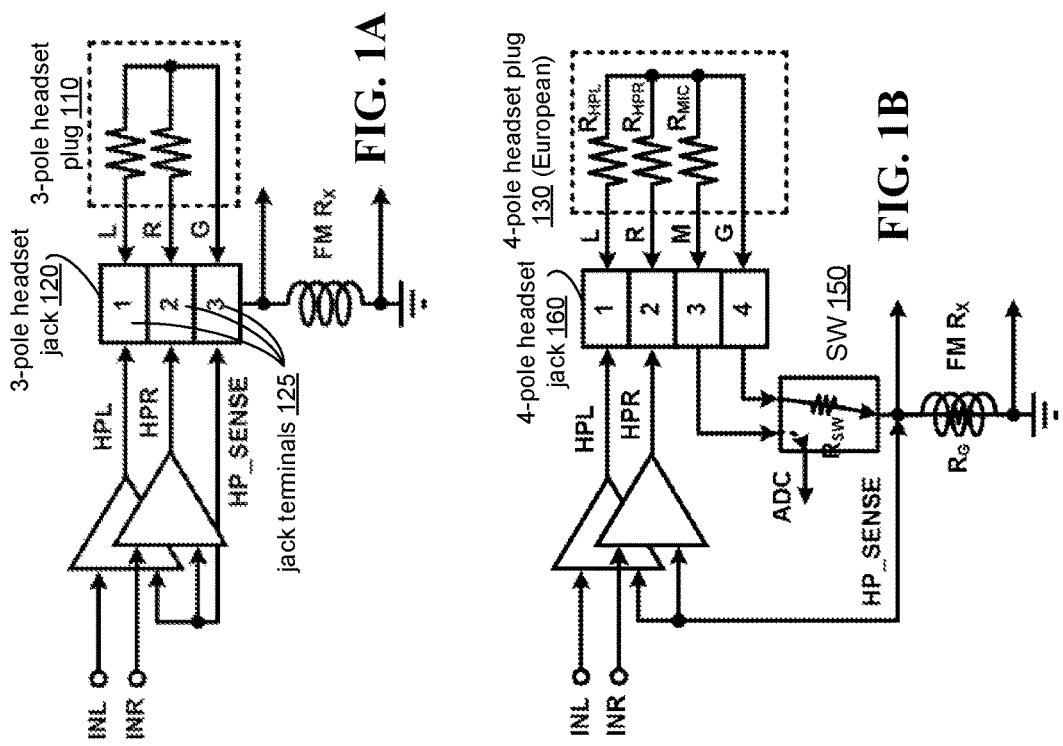
FIG. 1A illustrate a 3-pole headset plug connecting to a 3-pole headset jack.
FIG. 1B and FIG. 1C illustrate crosstalk problems in a 4-pole headset jack.
Figure 2:
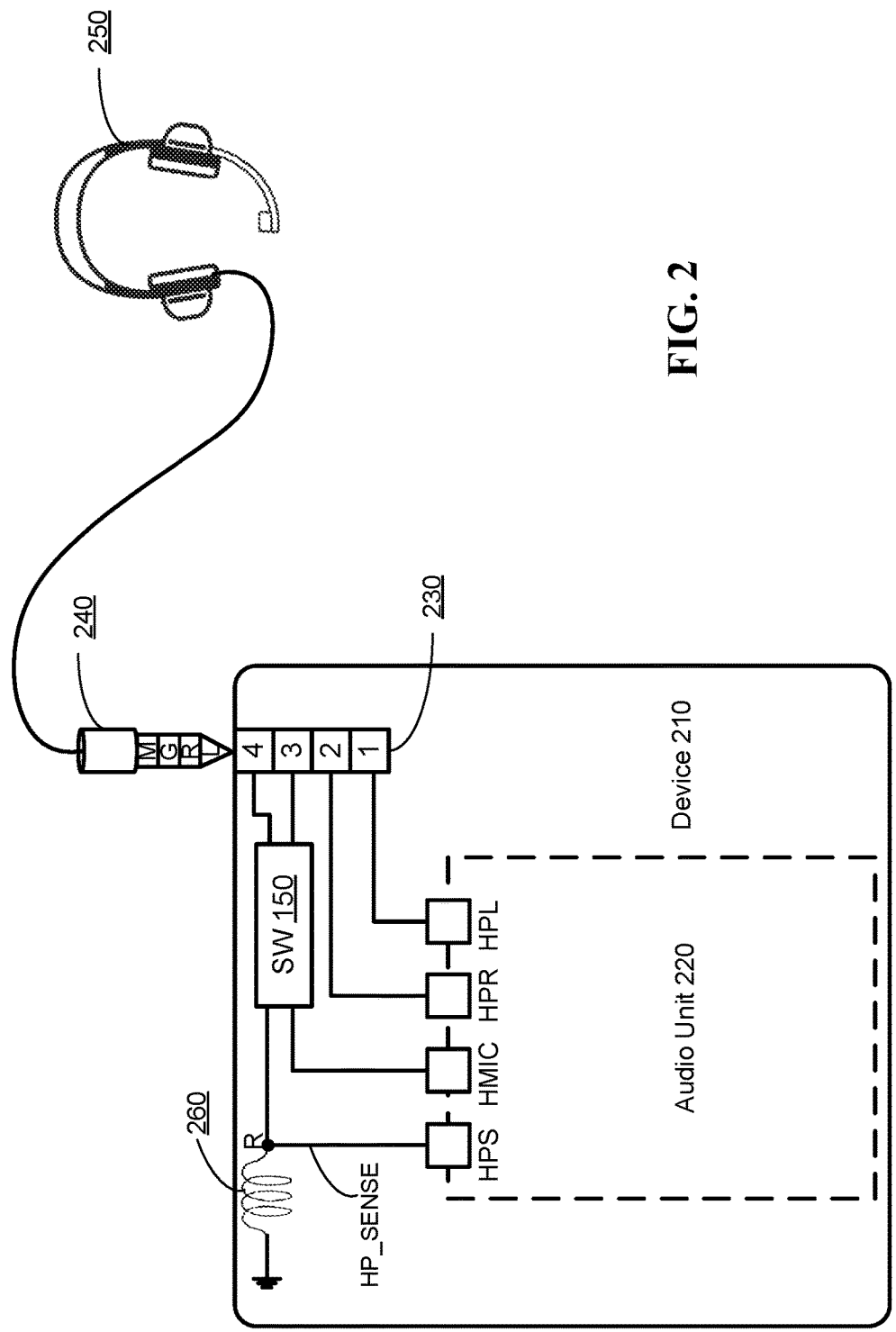
FIG. 2 illustrates a device connected to a headset according to one embodiment.

FIG. 2 illustrates a device 210 including an audio unit 220 and a jack 230 according to one embodiment. The device 210 may be any device capable of transmitting audio signals and receiving microphone signals. A headset 250 may be connected to the device by inserting a headset plug 240 into the jack 230. The jack 230 includes four terminals, labeled as 1, 2 3 and 4, to form electrical connections to plug terminals L, R, G and M, respectively. Although a North American type of a headset plug is shown as an example, it is understood that the crosstalk reduction to be described below is readily applicable to a European type or another type of a headset plug. Moreover, for simplicity of illustration, many components in the device 210 and the audio unit 220 are omitted, and the components shown in FIG. 2 are not drawn to scale. According to the embodiment of FIG. 2, the audio unit 220 includes four nodes, labeled as HPL, HPR, HMIC and HPS, which are respectively connected to jack terminals 1, 2, 4 and 3. More specifically, nodes HMIC and HPS are connected to jack terminals 4 and 3 via the swap switch 150. For a European type of headset plug, the swap switch 150 would be configured to swap its two connections, and nodes HMIC and HPS would be connected to jack terminals 3 and 4, respectively.

In the embodiment of FIG. 2, the audio unit 220 provides a left audio channel and a right audio channel to carry left and right audio signals, respectively. The left and right audio signals exit the audio unit 220 from nodes HPL and HPR, respectively. The audio unit 220 further provides a microphone channel, also referred to as an uplink channel, to receive the microphone signal from the headset 250. Node HMIC marks the entry point of the microphone signal into the audio unit 220. Node HPS is on the HP_Sense connection path, which is established between the audio unit 220 and a reference point R. The reference point R is connected to the G plug terminal via the swap switch 150 and the jack terminal 3. In one embodiment, a frequency modulation (FM) receiver 260 may be included between the reference point R and the ground for receiving FM radio signals.

In one embodiment, the audio unit 220 includes circuitry for removing headset crosstalk. As used herein, the terms "removing" or "remove" are used interchangeably as "reducing" and "reduce". Details of the audio unit 220 are provided in the embodiments to be described below with reference to FIGS. 3-7.

Figure 3:
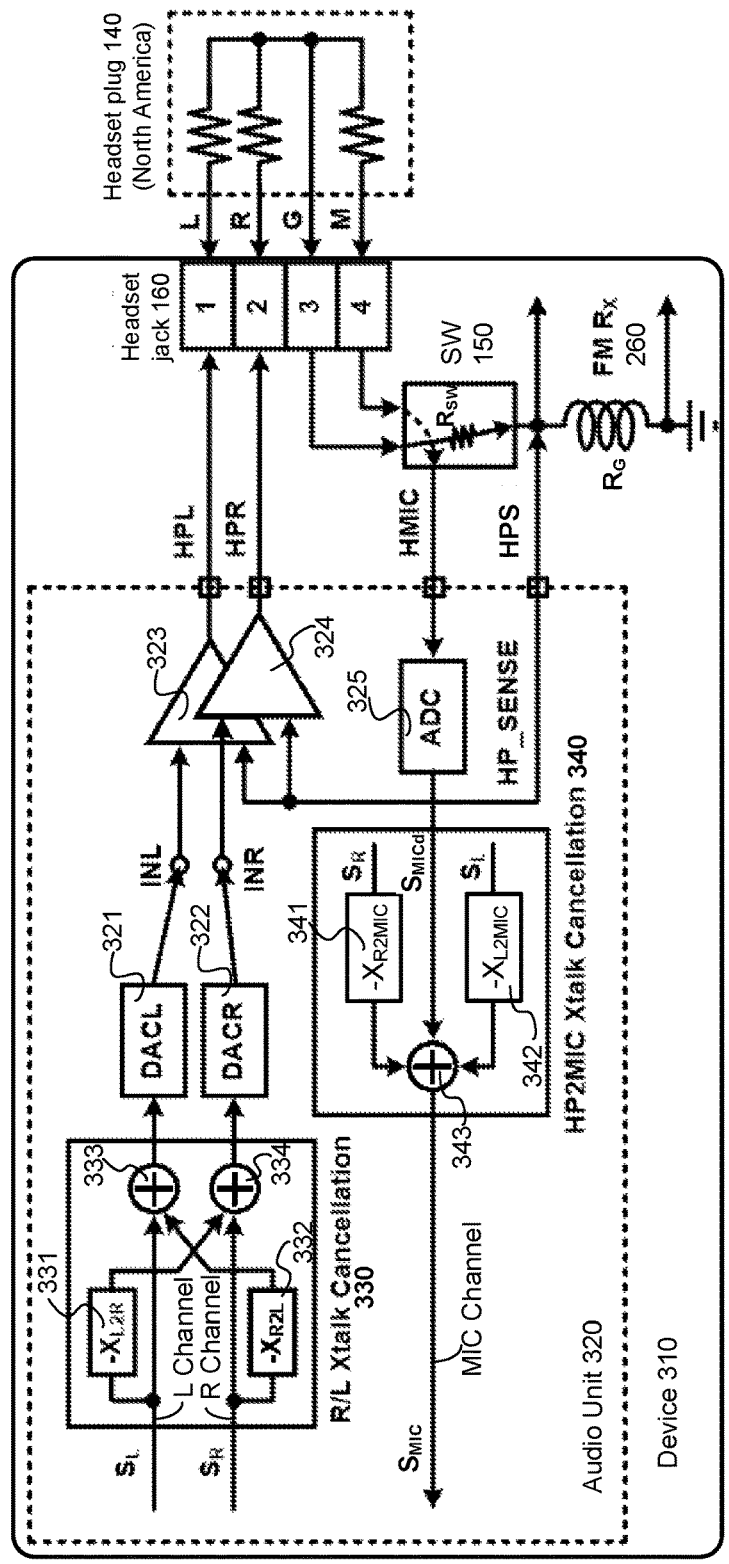
FIG. 3 illustrates an audio unit including crosstalk cancellation circuits according to one embodiment.

FIG. 3 illustrates a device 310 including an audio unit 320 according to one embodiment. The device 310 may be an example of the device 210 of FIG. 2, and the audio unit 320 may be an example of the audio unit 220 of FIG. 2. The device 310 includes the 4-pole headset jack 160 coupled to an audio unit 320 via nodes HPL, HPR, HMIC and HPS; other components in the device 310 are omitted to simplify the illustration. The headset jack 160 includes jack terminals 1, 2, 3 and 4 coupled to the headset plug terminals L, R, G and M, respectively. Between the audio unit 320 and the jack terminals are circuits that include the swap switch 150 and the FM receiver 260. The swap switch 150 is configured such that node HMIC is connected to the M plug terminal via the jack terminal 4, and node HPS is connected to the G plug terminal via the jack terminal 3.

The audio unit 320 provides a left audio channel (i.e., an L channel) and a right audio channel (i.e., an R channel). Each of the L channel and the R channel includes a digital path and an analog path, separated by a digital-to-analog converter (DAC) such as a DACL 321 and a DACR 322. The outputs of the DACL 321 and DACR 322 feed into amplifiers 323 and 324, respectively. The amplifiers 323 and 324 share a common input HP_Sense that is coupled to the G plug terminal via node HPS, the swap switch 150 and the jack terminal 3. The outputs of amplifiers 323 and 324 feed into nodes HPL and HPR via the respective analog paths to provide the L channel audio signal and the R channel audio signal, respectively, to the headset plug 140.

The audio unit 320 also provides a microphone channel to receive microphone signals from the M plug terminal of the headset plug 140. The microphone channel includes an audio path and a digital path separated by an analog-to-digital converter (ADC) 325.

In one embodiment, the audio unit 320 includes an R/L Xtalk cancellation circuit 330 to remove the crosstalk between the L and R channels. The R/L Xtalk cancellation circuit 330 is located in the digital paths of the L and R channels. The R/L Xtalk cancellation circuit 330 removes a right-to-left crosstalk and a left-to-right crosstalk, where "left" means the L channel and "right" means the R channel. In one embodiment, the R/L Xtalk cancellation circuit 330 includes multipliers 331 and 332, and adders 333 and 334. In an alternative embodiment, the multipliers 331, 332 and/or the adders 333, 334 may be located outside of and coupled to the R/L Xtalk cancellation circuit 330. In yet another embodiment, the multiplications and/or additions/subtractions may be performed by a digital processor coupled to the R/L Xtalk cancellation circuit 330.

In one embodiment, the multiplier 331 multiplies the L channel digital signal $S_L$ by a crosstalk coefficient $X_{L2R}$ to obtain the estimated left-to-right crosstalk. The multiplier 332 multiplies the R channel digital signal $S_R$ by a crosstalk coefficient $X_{R2L}$ to obtain the estimated right-to-left crosstalk. Accordingly, the estimated left-to-right crosstalk may be subtracted from the R channel digital signal $S_R$ by computing: $S_R - X_{L2R} \times S_L$, and the estimated right-to-left crosstalk may be subtracted from the L channel digital signal $S_L$ by computing: $S_L - X_{R2L} \times S_R$. In the embodiment shown in FIG. 3, the subtractions may be performed by the adders 333 and 334.

In one embodiment, the audio unit 320 also includes an HP2MIC Xtalk cancellation circuit 340 to remove the left-to-uplink crosstalk and the right-to-uplink crosstalk, where "uplink" means the microphone channel. The HP2MIC Xtalk cancellation circuit 340 is located on the digital path of the microphone channel. In one embodiment, the HP2MIC Xtalk cancellation circuit 340 includes multipliers 341, 342, and an adders 343. In an alternative embodiment, the multipliers 341, 342 and/or the adder 343 may be located outside of and coupled to the HP2MIC Xtalk cancellation circuit 340. In yet another embodiment, the multiplications and/or additions/subtractions may be performed by a digital processor coupled to the HP2MIC Xtalk cancellation circuit 340.

In one embodiment, the right-to-uplink crosstalk may be estimated by the multiplier 341 multiplying the R channel digital signal $S_R$ by a coefficient $X_{R2MIC}$, and the left-to-uplink crosstalk may be estimated by the multiplier 342 multiplying the L channel digital signal $S_L$ by a coefficient $X_{L2MIC}$. Accordingly, the right-to-uplink crosstalk and the left-to-uplink crosstalk may be subtracted from the microphone channel digital signal $S_{MICd}$ by computing: $S_{MICd} - X_{R2MIC} \times S_R - X_{L2MIC} \times S_L$, where the microphone channel digital signal $S_{MICd}$ is the microphone signal at the output end of the ADC 325. In the embodiment shown in FIG. 3, the subtractions may be performed by the adder 343.

In one embodiment, crosstalk coefficients $X_{R2L}$, $X_{L2R}$, $X_{R2MIC}$ and $X_{L2MIC}$ may be computed from a set of predetermined equations. The parameters used in the equations may include resistance values such as $R_{SW}$: the resistance of the swap switch (SW 150), $R_G$: the resistance of the ground connection, $R_{HPL}$: the resistance of the headset L plug terminal, $R_{HPR}$: the resistance of the headset R plug terminal, and $R_{MIC}$: the resistance of the headset M plug terminal.

Each of the mathematical equations (1)-(4) described below includes two parts: a first part before the approximation sign "≈", and a second part after the approximation sign. In the first part of the equations, the symbol "//" indicates that the two adjoining resistances are connected in parallel. In the second part of the equations, it is assumed that $R_{MIC} \gg R_{HPL} \gg R_{SW} > R_G$ and $R_{MIC} \gg R_{HPR} \gg R_{SW} > R_G$. Accordingly, the following equations may be used to calculate the crosstalk coefficients $X_{R2L}$, $X_{L2R}$, $X_{R2MIC}$ and $X_{L2MIC}$:

$$X_{R2L} = \frac{[R_{HPL} // R_{MIC} // (R_{SW} + R_G)]}{R_{HPR} + [R_{HPL} // R_{MIC} // (R_{SW} + R_G)]} \left( \frac{R_{SW}}{R_{SW} + R_G} \right) \approx \frac{R_{SW}}{R_{HPR} + (R_{SW} + R_G)}, \quad (1)$$

$$X_{L2R} = \frac{[R_{HPR} // R_{MIC} // (R_{SW} + R_G)]}{R_{HPL} + [R_{HPR} // R_{MIC} // (R_{SW} + R_G)]} \left( \frac{R_{SW}}{R_{SW} + R_G} \right) \approx \frac{R_{SW}}{R_{HPL} + (R_{SW} + R_G)}, \quad (2)$$

$$X_{R2MIC} = \frac{[R_{HPL} // R_{MIC} // (R_{SW} + R_G)]}{R_{HPR} + [R_{HPL} // R_{MIC} // (R_{SW} + R_G)]} \approx \frac{(R_{SW} + R_G)}{R_{HPR} + (R_{SW} + R_G)}, \quad (3)$$

and $$X_{L2MIC} = \frac{[R_{HPR} // R_{MIC} // (R_{SW} + R_G)]}{R_{HPL} + [R_{HPR} // R_{MIC} // (R_{SW} + R_G)]} \approx \frac{(R_{SW} + R_G)}{R_{HPL} + (R_{SW} + R_G)}. \quad (4)$$

In one embodiment, the crosstalk coefficients may be determined by factory test and/or chip final test, and stored in an on-chip non-volatile memory (such as a one-time programmable non-volatile memory; e.g., e-fuse) to be retrieved by the R/L Xtalk cancellation circuit 330 and the HP2MIC Xtalk cancellation circuit 340 for removing crosstalk in various audio playback and microphone usage scenarios.

Alternatively or additionally, the crosstalk coefficients may be determined by on-chip calibration performed in the background; that is, during operation of the device. In an embodiment to be described below with reference to FIG. 4, a device may include a crosstalk detector to determine the crosstalk coefficients during on-chip background calibration. In another embodiment to be described below with reference to FIG. 5, a device may include an impedance detector to determine the resistance values that are used to calculate or update the crosstalk coefficients.

Figure 4:
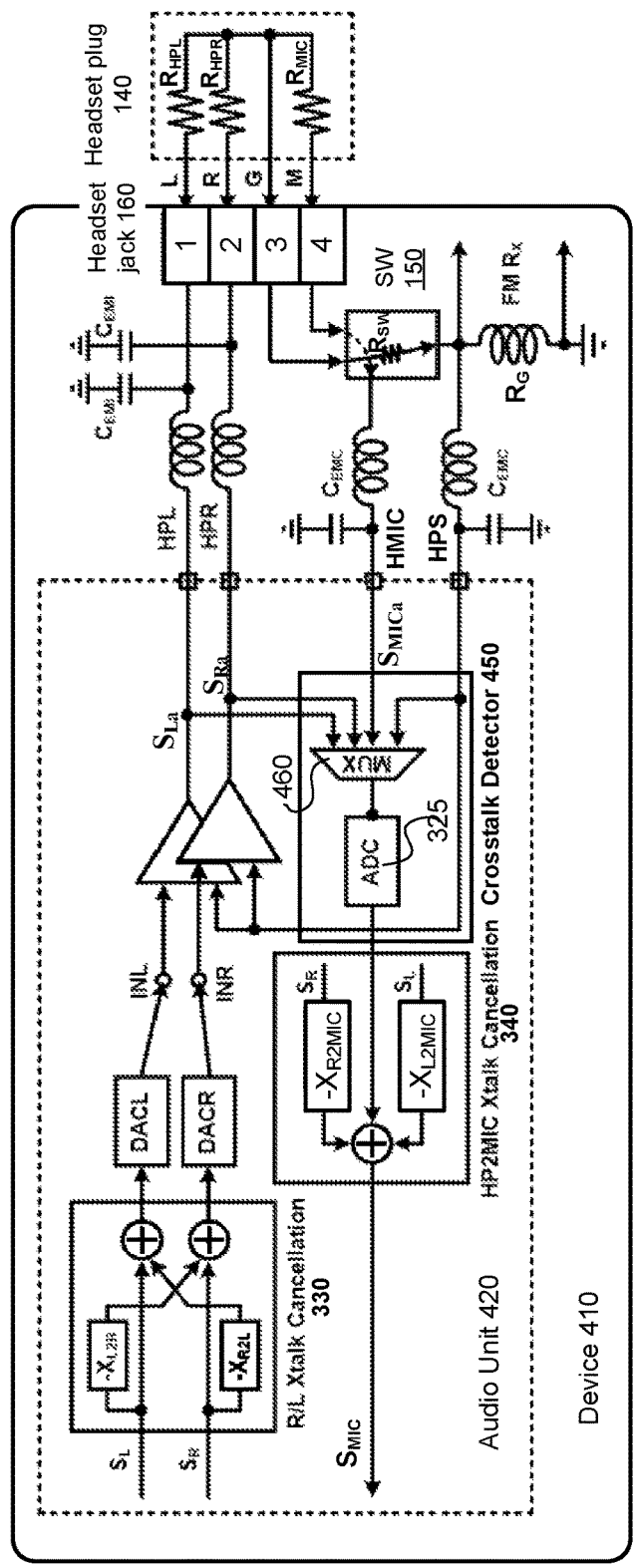
FIG. 4 illustrates an audio unit including a crosstalk detector according to one embodiment.

FIG. 4 illustrates a device 410 including an audio unit 420 according to another embodiment. The device 410 includes the headset jack 160, which is shown to be connected to the headset plug 140. The headset jack 160 terminals are coupled to nodes HPL, HPR, HMIC and HPS of the audio unit 420. Between the audio unit 420 and the jack terminals are circuits that include the swap switch 150, the FM receiver 260, and inductors and capacitors for EMI reduction. Other components in the device 410 are omitted to simplify the illustration.

In one embodiment, the audio unit 420 includes a crosstalk detector 450 in addition to all of the components of the audio unit 320 of FIG. 3. The crosstalk detector 450 detects the crosstalk signals in the L, R and microphone channels, and the detected crosstalk signals may be used to calculate or calibrate the crosstalk coefficients. In one embodiment, the crosstalk detector 450 includes a multiplexer 460 to receive inputs from the L channel analog path, the R channel analog path, the microphone channel analog path, and node HPS (which connects to the ground). The output of the multiplexer 460 feeds into an ADC, such as the ADC 325. In the embodiment shown in FIG. 4, the crosstalk detector 450 uses the same ADC 325 to detect crosstalk and to digitize microphone signals in the microphone channel. In an alternative embodiment, the crosstalk detector 450 may use another ADC for crosstalk detection.

Figure 5:
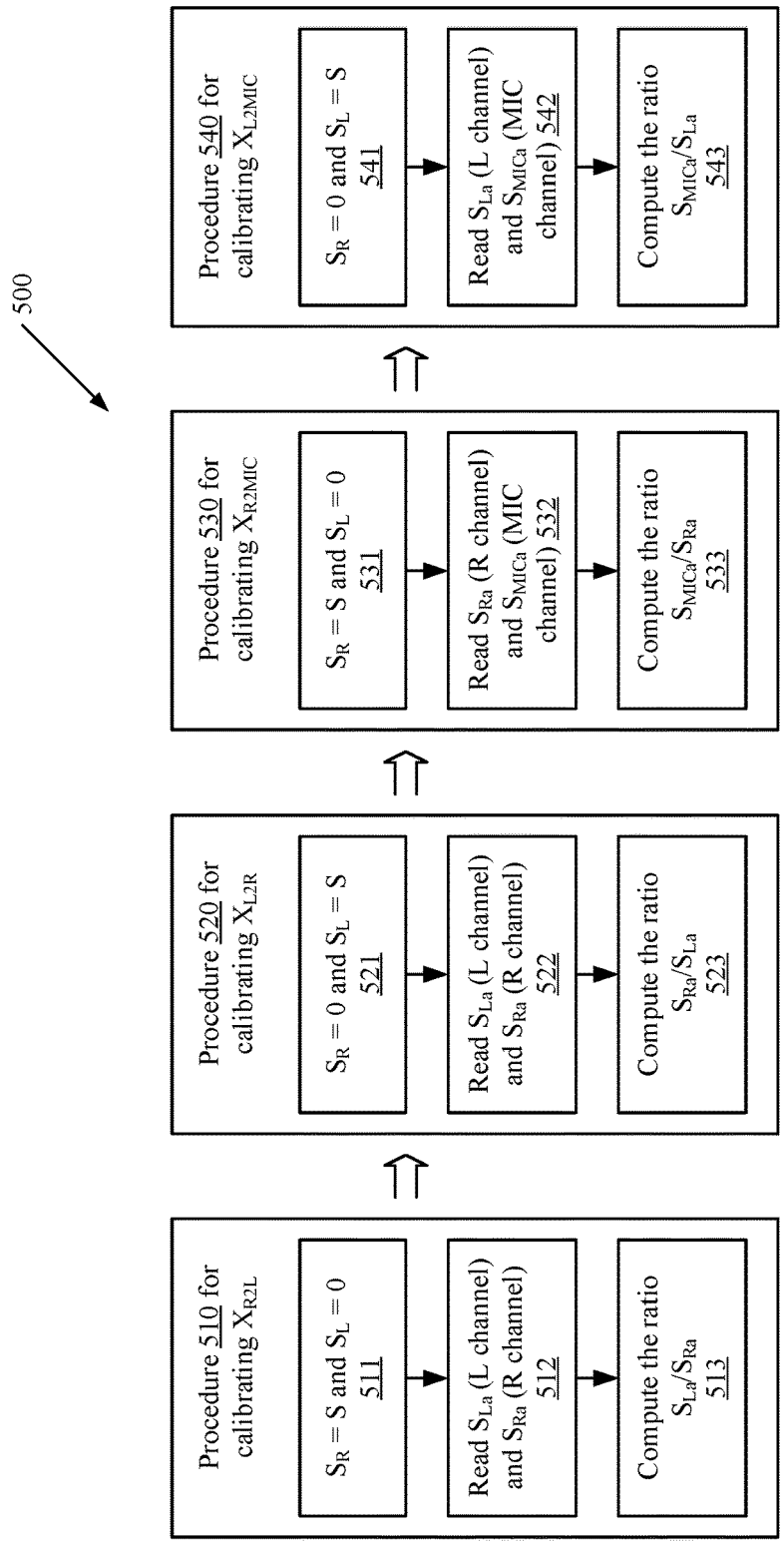
FIG. 5 illustrates a process for calibrating crosstalk coefficients according to one embodiment.

During an on-chip background calibration process, the crosstalk coefficients $X_{R2L}$, $X_{L2R}$, $X_{R2UL}$ and $X_{L2UL}$ may be measured or estimated by a method 500 shown in FIG. 5 according to an embodiment. Procedures 510-540 of the method 500 may be performed in any order, not limited by the order shown in FIG. 5. In an alternative embodiment, the procedures 510-540 of the method 500 may be performed in parallel provided that the crosstalk detector 450, the audio unit 420, or the device 410 includes hardware to support parallel calibration of the crosstalk coefficients.

The procedure 510 calibrates the value of $X_{R2L}$. At step 511, the right channel digital signal $S_R$ is set to a known value S (i.e., a test signal), and the left channel digital signal $S_L$ is set to zero. At step 512, the multiplexer 460 selects the L channel analog path to read an $S_{La}$ value, and selects the R channel analog path to read an $S_{Ra}$ value. At step 513, the ratio $S_{La}/S_{Ra}$ is computed. The ratio may be used by the R/L crosstalk cancellation circuit 330 as $X_{R2L}$.

The procedure 520 calibrates the value of $X_{L2R}$. At step 521, $S_R$ is set to zero, and $S_L$ is set to a known value S. At step 522, the multiplexer 460 selects the L channel analog path to read an $S_{La}$ value, and selects the R channel analog path to read an $S_{Ra}$ value. At step 523, the ratio $S_{Ra}/S_{La}$ is computed. The ratio may be used by the R/L Xtalk cancellation circuit 330 as $X_{L2R}$.

The procedure 530 calibrates the value of $X_{R2MIC}$. At step 531, $S_R$ is set to a known value S, and $S_L$ is set to zero. At step 532, the multiplexer 460 selects the R channel analog path to read an $S_{Ra}$ value, and selects the microphone channel analog path to read an $S_{MICa}$ value. At step 533, the ratio $S_{MICa}/S_{Ra}$ is computed. The ratio may be used by the HP2MIC Xtalk cancellation circuit 340 as $X_{R2MIC}$.

The procedure 540 calibrates the value of $X_{L2MIC}$. At step 541, $S_R$ is set to zero, and $S_L$ is set to a known value S. At step 542, the multiplexer 460 selects the L channel analog path to read an $S_{La}$ value, and selects the microphone channel analog path to read an $S_{MICa}$ value. At step 543, the ratio $S_{MICa}/S_{La}$ is computed. The ratio may be used by the HP2MIC Xtalk cancellation circuit 340 as $X_{L2MIC}$.

Figure 6:
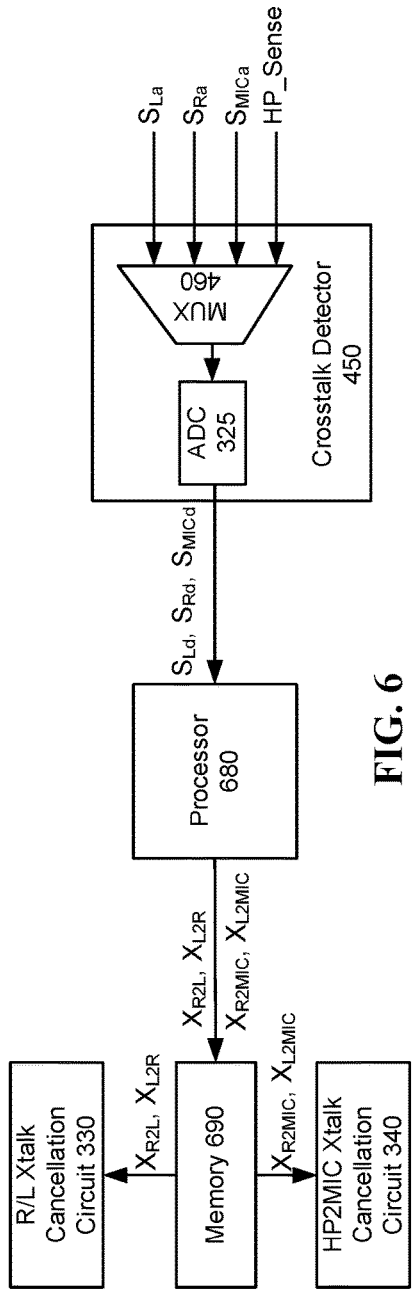
FIG. 6 illustrates a crosstalk detector coupled to a processor according to one embodiment.

In one embodiment, the calculations of the crosstalk coefficients at steps 513, 523, 533 and 543 may be performed by a processor or any processing circuitry in the device 410 (FIG. 4). FIG. 6 illustrates a processing circuitry such as a processor 680 coupled to the crosstalk detector 450 according to one embodiment. The processor 680 may be located anywhere in the device 410, including but not limited to within the audio unit 420 and/or within the crosstalk detector 450. As mentioned above with reference to FIG. 4 and FIG. 5, the crosstalk detector 450 receives the analog signals $S_{La}$, $S_{Ra}$ and $S_{MICa}$ from the analog paths of the L channel, the R channel and the microphone channel, respectively. The ADC 325 digitizes the analog signals into corresponding digital signals $S_{La}$, $S_{Ra}$ and $S_{MICd}$. These digital signals may be sent to the processor 680, which computes their ratios as described above at steps 513, 523, 533 and 543 of FIG. 5 to obtain the corresponding crosstalk coefficients. The crosstalk coefficients may be stored in a memory 690 such as an on-chip random access memory (RAM), to be retrieved by the R/L Xtalk cancellation circuit 330 and the HP2MIC Xtalk cancellation circuit 340 for removing crosstalk in various audio playback and microphone usage scenarios.

Figure 7:
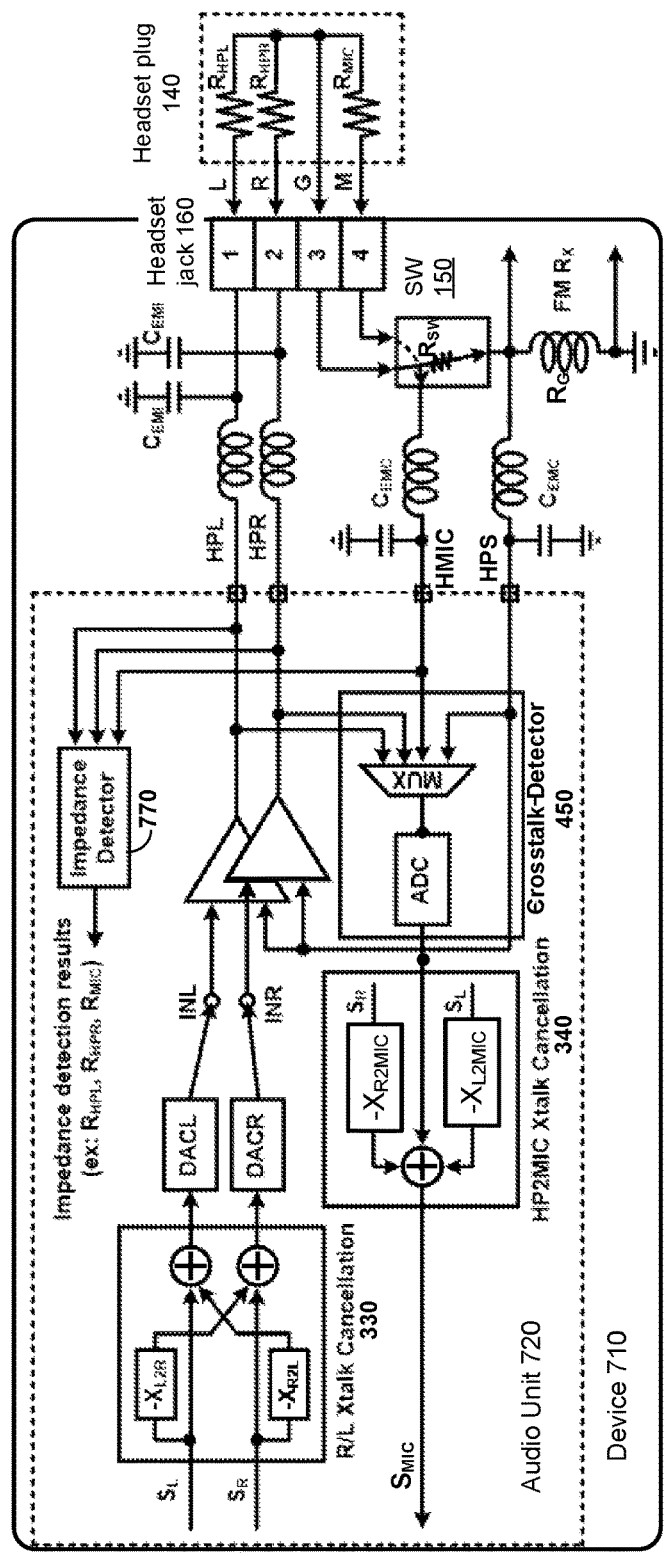
FIG. 7 illustrates an audio unit including an impedance detector according to one embodiment.

FIG. 7 illustrates a device 710 including an audio unit 720 according to another embodiment. Compared to the audio unit 420 of FIG. 4, the audio unit 720 additionally includes an impedance detector 770 for detecting the resistance values of the headset plug 140. Although the embodiment shows that the audio unit 720 includes both the impedance detector 770 and the crosstalk detector 450, it should be understood that the impedance detector 770 may operate independently of the crosstalk detector 450. Thus, in an alternative embodiment, the audio unit 720 may include only the impedance detector 770 but not the crosstalk detector 450.

In one embodiment, the impedance detector 770 monitors the values of $R_{HPL}$, $R_{HPR}$ and $R_{MIC}$ of the headset plug 140. As shown in the equations (1)-(4) described above, the crosstalk coefficients $X_{R2L}$, $X_{L2R}$, $X_{R2MIC}$ and $X_{L2MIC}$ are dependent on the values $R_{HPL}$, $R_{HPR}$ and $R_{MIC}$, which may vary with different headset plugs. Thus, the crosstalk coefficients calibrated for one headset may not be suitable for another headset. The impedance detector 770 may monitor the resistance of the headset plug 140 during operation of the audio unit 720. When a change in the resistance is detected, the crosstalk coefficients may be re-computed or updated accordingly.

Figure 8:
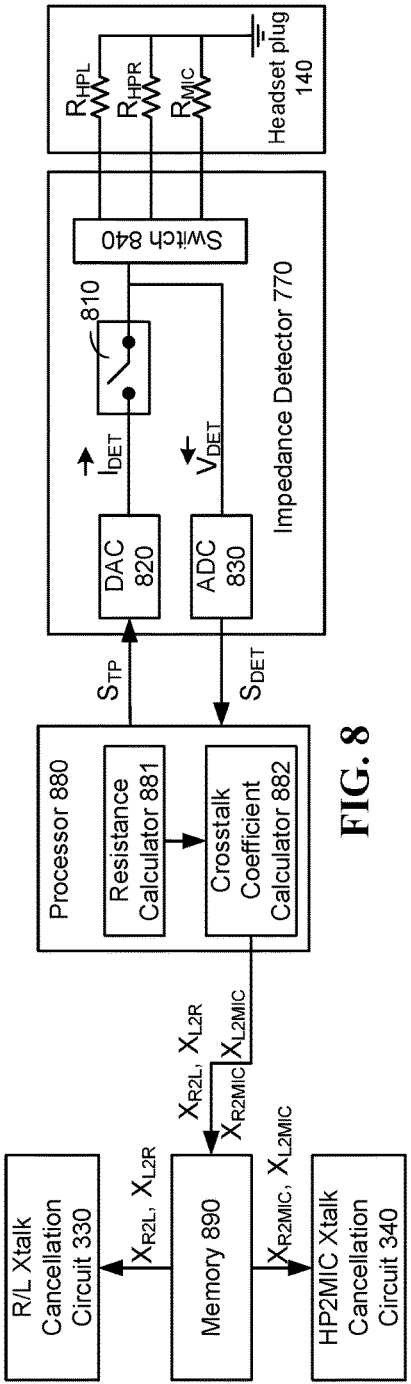
FIG. 8 illustrates an impedance detector coupled to a processor according to one embodiment.

FIG. 8 illustrates the impedance detector 770 according to one embodiment. In this embodiment, some components are omitted to simplify the illustration of the basic concept of impedance detection. In the embodiment as shown, a processing circuitry such as a processor 880 is coupled to the impedance detector 770 to perform the calculations of the resistance values and the crosstalk coefficients. In an alternative embodiment, the processor 880 may be located anywhere in the device 710 (FIG. 7), including but not limited to within the audio unit 720 and/or within the impedance detector 770. In one embodiment, the impedance detector 770 may include a processing circuitry to calculate the resistance values, or to calculate the resistance values and the crosstalk coefficients.

In the embodiment of FIG. 8, the impedance detector 770 includes a switch 840 to selectively establish a connection with one of the resistors: $R_{HPL}$, $R_{HPR}$ and $R_{MIC}$. In another embodiment, the three resistance values may be measured in parallel provided that the impedance detector 770, the audio unit 720, or the device 710 includes hardware to support parallel measurements of the resistance values. The impedance detector 770 may include another switch 810, which may be turned on/off by the processor 880 to enable or disable the impedance detection.

In one embodiment, the processor 880 injects a digital test signal $S_{TP}$ to the impedance detector 770 to measure a resistance value. The impedance detector 770 uses a DAC 820 to convert $S_{TP}$ into an analog signal. The analog signal is sent as a current signal $I_{DET}$ to the selected resistor. A return signal carries the voltage $V_{DET}$ is digitized by an ADC 830 into a digital signal $S_{DET}$, and $S_{DET}$ is sent back to the processor 880. The processor 880 measures the voltage drop across the resistor based on $S_{TP}$ and $S_{DET}$, and divides the voltage drop by the injected current value to obtain the resistance value of the selected resistor. In one embodiment, the processor 880 may include a resistance calculator 881 that calculates a resistance value based on the measured voltage drop. The processor 880 may further include a crosstalk coefficient calculator 882 that calculates or updates the crosstalk coefficients. The crosstalk coefficients may be stored in a memory 890 such as an on-chip RAM, to be retrieved by the R/L Xtalk cancellation circuit 330 and the HP2MIC Xtalk cancellation circuit 340 for removing crosstalk in various audio playback and microphone usage scenarios.

Further details of the impedance detection may be found, for example, in the U.S. Patent Application Publication No. 2015/0230018, entitled "Devices and Methods for Headphone Speaker Impedance Detection."

Figure 9:
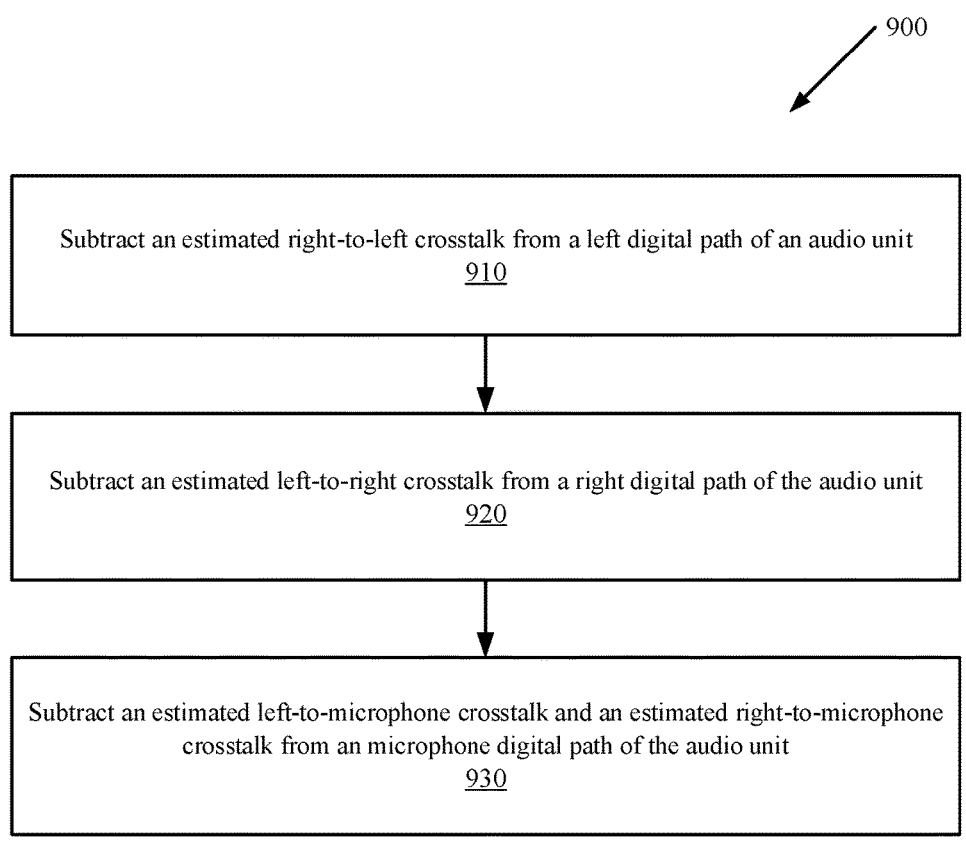
FIG. 9 is a flow diagram illustrating a method for removing headset crosstalk according to one embodiment.

FIG. 9 is a flow diagram illustrating a method 900 for removing headset crosstalk according to one embodiment. The method 900 may be performed by an audio unit, which forms an electrical connection with a ground terminal and a microphone terminal of a headset plug via a swap switch that is configurable to swap connections of the ground terminal and the microphone terminal to the audio unit. The resistance of the swap switch contributes to the crosstalk in the L channel, R channel and the microphone channel of the audio unit. Non-limiting examples of the audio unit are shown as the audio unit 320 of FIG. 3, the audio unit 420 of FIG. 4 or the audio unit 720 of FIG. 7. More specifically, the method 900 may be performed by the R/L Xtalk cancellation circuit 330 and the HP2MIC Xtalk cancellation circuit 340 of FIGS. 3, 4 and 7.

At step 910, the R/L Xtalk cancellation circuit 330 subtracts an estimated right-to-left crosstalk from a left digital path of an audio unit; at step 920, the R/L Xtalk cancellation circuit 330 subtracts an estimated left-to-right crosstalk from a right digital path of the audio unit; and at step 930, the HP2MIC Xtalk cancellation circuit 340 subtracts an estimated left-to-microphone crosstalk and an estimated right-to-microphone crosstalk from a microphone digital path of the audio unit. Steps 910-930 may be performed in any order; in one embodiment, steps 910-930 may be performed in parallel.

In one embodiment, the estimated crosstalk in steps 910-930 may be calculated as follows. Referring to FIG. 3, in one embodiment, the multiplier 331 of the R/L Xtalk cancellation circuit 330 is operative to multiply a right-to-left crosstalk coefficient ($X_{R2L}$) by a right channel digital signal ($S_R$) to calculate the estimated right-to-left crosstalk; the multiplier 332 of the R/L Xtalk cancellation circuit 330 is operative to multiply a left-to-right crosstalk coefficient ($X_{L2R}$) by a left channel digital signal ($S_L$) to calculate the estimated left-to-right crosstalk; the multiplier 341 of the HP2MIC Xtalk cancellation circuit 340 is operative to multiply a right-to-microphone crosstalk coefficient ($X_{R2MIC}$) by $S_R$ to calculate the estimated right-to-microphone crosstalk; and the multiplier 342 of the HP2MIC Xtalk cancellation circuit 340 is operative to multiply a left-to-microphone crosstalk coefficient ($X_{L2MIC}$) by $S_L$ to calculate the estimated left-to-microphone crosstalk.

The headset crosstalk reduction systems, methods and circuits described above not only removes the crosstalk between a left audio channel and a right audio channel, but also removes the crosstalk from the left and right audio channels to a microphone channel. The crosstalk may be estimated and subtracted from digital paths of the left, right and microphone channels. Simulation results have shown that the disclosed systems, methods and circuits achieve significant crosstalk reduction.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A device operative to remove crosstalk, the device comprising:

an audio unit to provide a left audio channel and a right audio channel to a plug; and
a jack to form an electrical connection with the plug, wherein the audio unit further comprises:
a crosstalk cancellation circuit to estimate the crosstalk between the left audio channel and the right audio channel to obtain an estimated right-to-left crosstalk and an estimated left-to-right crosstalk, and to remove the crosstalk by subtracting the estimated right-to-left crosstalk and the estimated left-to-right crosstalk from digital signals in the left audio channel and the right audio channel, respectively.

2. The device of claim 1, wherein the crosstalk cancellation circuit further comprises:
a first multiplier to multiply a right-to-left crosstalk coefficient by a right channel digital signal propagating in the right audio channel to thereby calculate the estimated right-to-left crosstalk; and
a second multiplier to multiply a left-to-right crosstalk coefficient by a left channel digital signal propagating in the left audio channel to thereby calculate the estimated left-to-right crosstalk.

3. The device of claim 1, wherein the audio unit further comprises:
a left digital-to-analog converter (DAC), for separating a left digital path from a left analog path of the left audio channel; and a right DAC, for separating a right digital path from a right analog path of the right audio channel.

4. The device of claim 3, wherein the audio unit further comprises:
amplifiers for amplifying signals output by the left DAC and the right DAC and providing amplified signals to the plug.

5. The device of claim 1, wherein the audio unit further comprises:
a crosstalk detection circuit having input terminals coupled to at least a left analog path of the left audio channel and a right analog path of the right audio channel, the crosstalk detection circuit to selectively receive crosstalk signals from two of the input terminals when a digital source signal is sent to a digital path in one of the left audio channel and the right audio channel.

6. The device of claim 5, wherein the crosstalk detection circuit further includes:
a multiplexer to receive input from the input terminals and to send output to an analog-to-digital converter (ADC).

7. The device of claim 6, wherein the crosstalk detection circuit is coupled to a processing circuitry to compute a ratio of digitized crosstalk signals from the two of the input terminals, and wherein the first crosstalk cancellation circuit or the second crosstalk cancellation circuit uses the ratio for on-chip background calibration.

8. The device of claim 1, wherein the audio unit further comprises:
an impedance detection circuit to send one or more test signals to the plug connected to the device to detect a resistance of a left terminal and a resistance of a right terminal.

9. The device of claim 8, wherein the impedance detection circuit is coupled to a processing circuitry to use resistance values detected by the impedance detection circuit to determine crosstalk coefficients, and wherein the crosstalk cancellation circuit uses the crosstalk coefficients to remove the crosstalk.

10. A device operative to remove crosstalk, the device comprising:

an audio unit to provide a left audio channel, a right audio channel and a microphone channel to a plug;

a jack to form an electrical connection with the plug; and a swap switch configurable to swap connections of a ground terminal and a microphone terminal of the plug to the audio unit, wherein the audio unit further comprises:

a crosstalk cancellation circuit to estimate the crosstalk from the left audio channel and the right audio channel to the microphone channel to obtain an estimated left-to-microphone crosstalk and an estimated right-to-microphone crosstalk, and to remove the crosstalk by subtracting the estimated left-to-microphone crosstalk and the estimated right-to-microphone crosstalk from a digital signal in the microphone channel.

11. The device of claim 10, wherein the crosstalk cancellation circuit further comprises:

a first multiplier to multiply a right-to-microphone crosstalk coefficient by a right channel digital signal to thereby calculate the estimated right-to-microphone crosstalk; and a second multiplier to multiply a left-to-microphone crosstalk coefficient by a left channel digital signal to thereby calculate the estimated left-to-microphone crosstalk.

12. The device of claim 10, wherein the audio unit further comprises:

a crosstalk detection circuit having input terminals coupled to at least a left analog path of the left audio channel, a right analog path of the right audio channel and a microphone analog path of the microphone channel, the crosstalk detection circuit to selectively receive crosstalk signals from two of the input terminals when one of the digital signals in the left audio channel and the right audio channel is set to be zero.

13. The device of claim 12, wherein the crosstalk detection circuit further comprises:

a multiplexer to receive input from the input terminals and to send output to an analog-to-digital converter (ADC).

14. The device of claim 12, wherein the crosstalk detection circuit is coupled to a processing circuitry to compute a ratio of digitized crosstalk signals from the two of the input terminals, and wherein the first crosstalk cancellation circuit or the second crosstalk cancellation circuit uses the ratio for on-chip background calibration.

15. The device of claim 13, wherein the ADC is coupled between the microphone digital path and the microphone analog path of the microphone channel.

16. The device of claim 10, wherein the audio unit further comprises:

an impedance detection circuit to send one or more test signals to the plug connected to the device to detect a resistance of a headset left terminal, a resistance of a right terminal and a resistance of a microphone terminal.

17. The device of claim 16, wherein the impedance detection circuit is coupled to a processing circuitry to use resistance values detected by the impedance detection circuit to determine crosstalk coefficients, and wherein the crosstalk cancellation circuit uses the crosstalk coefficients to remove the crosstalk.

* * * * *